United States Patent Office 3,634,220
Patented Jan. 11, 1972

3,634,220
METHOD FOR IMPROVING GRAPHITE FIBERS FOR PLASTIC REINFORCEMENT AND PRODUCTS THEREOF
John C. Goan, Alexandria, Va., assignor to the United States of America as represented by the Secretary of the Navy
No Drawing. Filed Sept. 19, 1968, Ser. No. 760,969
Int. Cl. B01r 1/00
U.S. Cl. 204—164        8 Claims

ABSTRACT OF THE DISCLOSURE

A method of improving the bonding between graphite fibers and a plastic matrix material which involves contacting the surface of the graphite fiber with oxygen gas subjected to a radio frequency or microwave energy electrical field discharge and the products thereof.

BACKGROUND OF THE INVENTION

This invention relates generally to graphite-plastic composite materials and more specifically to a method of treating the surfaces of graphitic fibrous materials in the form of single fibers, yarn or cloth, to render said surfaces more adhesive towards a plastic matrix, and the products thereof.

Composite materials, such as, for example, glass fiber reinforced plastics, are well established as engineering materials and have found extensive use in the areas of underwater equipment, boat hulls and numerous aircraft structural elements. Primarily, composite materials of this nature are of extreme interest because they provide unique combinations of properties, not otherwise obtainable, such as high strength-density and stiffness density ratios, good mechanical shock resistance, high corrosion resistance, nonmagnetic nature and ease of fabrication. Of all the new fibrous reinforcement known to date, the material which seems to be the most promising is graphite. However, the strength and permanence of the strength properties of composite materials, particularly in an adverse environment, is highly dependent on the interfacial bonding of the composites, i.e., strength of the bonding between the reinforcement fiber and the plastic matrix.

In the past, the interlaminar shear strength values, which are a measure of the degree of bonding or adhesiveness of the fiber reinforcement to the plastic matrix, of graphite fiber-plastic composites have been so low that a widespread use of these materials has been hindered. Recently, various approaches attempting to solve this problem without seriously reducing the ultimate strand tensile strength of the fiber have been offered. Among the more successful of these methods are those which involve the chemical activation of the graphite fiber surface by wet and dry oxidizing systems. The wet oxidizing systems, such as nitric acid, have been found to be successful but have also proven to be tedious and time-consuming. On the other hand, the dry oxidizing techniques of the prior art, although less tedious and time consuming than the wet techniques, have not been entirely satisfactory since either the interlaminar shear strength values of the final composites are still found to be too low for any widespread efficient use of the composites or else the strand tensile strength of the fibers has been so severely reduced that again the many capabilities of the composites become limited.

SUMMARY OF THE INVENTION

It is, therefore, an object of this invention to provide a method which substantially improves the adhesiveness and bonding of graphite fibrous materials toward plastic matrices without severely damaging the ultimate strand tensile strength of the fiber.

It is a further object of this invention to provide a method which substantially improves the bonding of graphite fibrous material to plastic matrices which is simple and fast.

It is still a further object of this invention to provide a surface modified graphite material which possesses improved bonding properties towards plastics.

Another object of this invention is to provide a graphite plastic composite material with good interlaminar shear properties and good tensile strength.

These and other objects are attained by exposing a graphite fibrous material in the form of single fibers, yarn, or cloth, for a time sufficient to improve the bonding qualities of the material, to vapors of oxygen under the influence of an electromagnetic wave field. The graphite-plastic composites of the present invention are then fabricated by employing any of the conventional procedures known for making composite materials by combining this improved bonding and surface oxidized graphite fibrous material with any suitable matrix material. A discussion of the procedures which may be employed for making composite materials of this nature may be found in the Handbook of Reinforced Plastics of the Society of the Plastics Industry, Inc., edited by S. S. Oleesky and J. G. Mohr, Reinhold Publishing Co., New York, N.Y., 1964, especially pages 161, 292–300 and 539.

DESCRIPTION OF THE PREFERRED EMBODIMENTS

The surface of any graphite material either in the form of single fibers, yarn or cloth may be treated by the technique of the present invention.

In one embodiment of the invention, the graphite fibrous material is treated in a batch process by winding the material on an open spool made of a non-conductive material, e.g. glass, and constructed in such a way that the gaseous reactants will penetrate to all parts of the fiber, and then inserted into a tubular chamber. This chamber is also made of a non-conductive material and has an inlet to allow the admission of oxygen gas and an outlet to allow the evacuation of any gaseous impurities. The chamber holding the spool is then evacuated and oxygen gas is admitted under a reduced pressure and a steady stream of the gas is maintained during the subsequent operations. For purposes of explanation and not limitation, the pressure in the chamber should not exceed 10 mm. of mercury, while a pressure of 0.30 mm. of mercury is preferred. The next step in the preparation of the improved graphite is the initiation of a glow discharge in the oxygen gas. This is accomplished by exciting the gas with an electrical field discharge provided by radio-frequency energy from a coil which is wound externally around the tubular chamber, thus coupled into the gas inductively. Alternately, the discharge and excitation of the oxygen may be accomplished employing microwave energy which is coupled into the gas capacitively.

The power employed by either of these techniques may be between 20 and 200 watts, while the residence time of the graphite material in the activated gas is dependent upon the amount of applied power. Preferably, a residence time of three hours at 60 watts of power is used. The effect of the radio-frequency or microwave discharge on the oxygen gas is a breakdown of the gas into a highly active oxidizing species having free oxygen atoms and excited oxygen molecules. The reaction of the activated oxygen upon the graphite fibrous material results in an improved bonding and surface oxidized material.

Another embodiment of the present invention encompasses a continuous treatment process of the graphite material rather than a batch process as described hereinbefore. The reaction conditions used in the continuous treatment process may be the same as those used in the batch process.

While it is not completely understood precisely why the technique results in improved adhesiveness of the graphite material, it is believed that the oxidation process produces quinone groups, phenolic groups and carboxylic acid groups on the surface of the fiber, which act favorably towards and thereby attract the plastic matrix material.

Any of the plastic matrix materials commonly used to make composite materials may be reinforced with the treated graphite fibrous materials of the present invention. Among the more common plastic matrix materials which may be employed are polyesters, phenolics, polyimids, polybenzimidazoles, polyquinoxalines, polypyrones, polyamides and especially epoxy resins.

The general nature of the invention having been set forth, the following example is presented as a specific illustration thereof. It will be understood that the invention is not limited to this example but is susceptible to different modifications that will be recognized by one of ordinary skill in the art.

Example

Ten grams of Union Carbide Corporation's 40 million p.s.i. modulus graphite yarn Thornel 40 (WYF 115½ high modulus graphite yarn) was wound on an open glass spool. The spool was constructed in such a way that the gaseous reactants could penetrate to all parts of the fiber. This spool was inserted into a glass tubular chamber which had an exit leading to a vacuum pump and an inlet leading to a tank of dry oxygen gas. After the chamber was closed off, it was evacuated to a pressure equivalent to 0.015 mm. of mercury. Oxygen was then admitted through a valve to a pressure equivalent to 0.300 mm. of mercury. A flowing stream of oxygen at this pressure was maintained in the vacuum chamber during the subsequent operations. A glow discharge was then initiated in the oxygen. This was accomplished by exciting the gas with radio-frequency energy from a coil wound externally around the glass chamber. Meters in the circuitry of the radio-frequency generator measured the discharge current and potential. The reaction of the activated oxygen with the graphite resulted in a surface modified graphite fiber material. The residence time of the graphite in the activated oxygen was three hours and a discharge current of 170 milliamps and a discharge potential of 330 volts was employed to produce the activated oxygen. A similar experiment was repeated using Union Carbide Corporation's 25 million p.s.i. modulus graphite yarn Thornel 25 (WYD 115½ high modulus graphite yarn), giving similar results.

A composite material specimen was then made in the form of an NOL ring containing 65 volume percent graphite, by passing the hereinbefore treated fiber through Union Carbide Corporation's epoxy resin Bakelite system, ERLA 2256/ZZL 0820 (27 phr.) over a tensioning device and on to a rotating mold. The function of the tensioning device is to control the final amount of fiber in the composite. The mold was then removed from the NOL ring winding device and placed in a curing oven to harden the resin. For this particular resin a curing schedule of three hours at 100° C. and three hours at 150° C. was followed. The Union Carbide Corporation epoxy resin system employed here is comprised of a mixture of 62½ percent diglycidyl ether of Bisphenol A and 37½ percent bis(2,3-epoxy cyclopentyl) ether, with the mixture having an epoxy equivalent weight of 140–150. A hardener is also employed in the system and is an eutectic mixture of metaphenyline diamine and methylene dianiline. A discussion of NOL ring specimens and their manufacture may be found in Plastic Technology, November 1958, pp. 1017–1024 and Proceedings of 21st Annual Tech. Conf., SPI Reinforced Plastics Division, Section 8–D, February 1966.

The results obtained in comparing the interlaminar shear strength values of the composite materials made of the graphite fibrous material treated by the technique of the present invention with the composite material made of the same graphite fibrous material and treated by the prior art methods are summarized in Table 1. Further, a summary of the results obtained in comparing the tensile strength of the fibers oxidized by the method of the present invention as opposed to the fibers oxidized by the prior art techniques is found in Table 2.

TABLE 1

Effect of Oxidation on Shear Strength of Thornel 25 NOL Rings Resin System: Union Carbide Corporation's Bakelite ERLA 2256/ZZL 0820 (phr.); vacuum impregnated

| | Average shear, short beam specimen | | | |
|---|---|---|---|---|
| | Dry | | 6 hour boil | |
| Graphite fiber-epoxy resin composite | P.s.i. | N/m.²×10⁻⁶ | P.s.i. | N/m.²×10⁻⁶ |
| Unoxidized Thornel 25 (PVA coating) | 3,600 | 24.8 | 3,500 | 24.1 |
| Unoxidized Thornel 25 (no PVA coating) | 4,100 | 28.2 | 4,100 | 28.2 |
| Air oxidized (400° C.) | 5,900 | 40.5 | 6,400 | 44.2 |
| Oxidized in ozone | 5,000 | 34.5 | 4,800 | 33.1 |
| Oxidized in RF discharge | 5,800 | 39.9 | 6,200 | 42.7 |

TABLE 2

Strand Tensile Tests of Oxidized Fibers

| | Average ultimate tensile strength | |
|---|---|---|
| Fiber | P.s.i. | N/m.²×10⁻⁶ |
| Untreated Thornel 25 | 198,000 | 1,360 |
| Air oxidized | 141,000 | 970 |
| RF discharge oxidized | 180,000 | 1,240 |

Table 1 summarizes the test results obtained from the graphite fiber-epoxy resin composite in the form of an NOL ring specimen containing 65 volume percent graphite. The adhesive forces in the composite were measured on segments of the ring by a short beam shear test, ASTM–2344–65 T. This is a three point loading of the specimen using a span to depth ratio of 5:1. The value of the interlaminar shear strength measured by this test reflects the degree of bonding of resin matrix to fiber in the composite. Values are given for the dry composite and also for the composite after boiling in water for six hours.

The results shown in Tables 1 and 2 clearly demonstrate the substantial improvement in the interfacial bonding of the composite material employing the RF discharge technique of the present invention without any critical reduction in the tensile strength of the fibers. Furthermore, Tables 1 and 2 demonstrate the superiority of the present technique over the prior art techniques. Note for example, the lower shear strength values obtained employing the ozone oxidation method, as opposed to the present method, especially after the composite was boiled for 6 hours. Although the air oxidation technique produces about the same high shear strength values as the present method, Table 2 demonstrates the severe and critical reduction in the strand tensile strength of the fiber employing the air oxidation system. Such a reduction in fiber strength would prevent any effective widespread use of these composites. In contrast, the graphite-plastic composite materials prepared employing the techniques of the present invention have high enough interlaminar shear and strand tensile strength values to allow for a more widespread and efficient use of these materials.

The composite materials prepared by the methods of the present invention are useful in all areas where a high strength but low weight material is required. More specifically these composites are useful materials in the manufacture of aircraft parts, such as turbine blades for jet engines, underwater equipment and pressure containers.

As will be evident to those skilled in the art, various modifications can be made in light of the foregoing disclosure without departing from the scope and spirit there- Having described the invention what is claimed and desired by Letters Patent is:

1. A method of producing a surface modified graphite material said method comprising exposing a graphite material to oxygen gas under the influence of an electrical discharge within the combined radio frequency and microwave bandwidth.

2. The method of claim 1 wherein said exposure of the graphite material to oxygen is accomplished under reduced pressure.

3. The method of claim 2 wherein said reduced pressure is less than about 10 mm. of Hg absolute.

4. The method of claim 3 wherein said electrical discharge in a high frequency range is generated by a power input of between 20 and 200 watts.

5. The method of claim 1 wherein said electrical discharge is a radio-frequency energy discharge.

6. The method of claim 1 wherein said electrical discharge is a microwave energy discharge.

7. The method of claim 1 wherein the graphite material is selected from the group consisting of graphite fibers, graphite yarn and graphite cloth.

8. A graphite material having a modified surface produced by the method of claim 1.

References Cited
UNITED STATES PATENTS

| | | | |
|---|---|---|---|
| 3,485,666 | 12/1969 | Sterling et al. | 204—192 X |
| 3,395,091 | 7/1968 | Sinclair | 204—192 |
| 3,433,725 | 3/1969 | Hough et al. | 204—312 |

OTHER REFERENCES

Holland, Vac. Dep. Of Thin Films, Chapman & Hall Ltd., London, 1963, p. 415.

JOHN H. MACK, Primary Examiner

R. J. FAY, Assistant Examiner

U.S. Cl. X.R.

204—192